United States Patent [19]

Biron

[11] 4,272,789

[45] Jun. 9, 1981

[54] PULSE-FORMING CIRCUIT FOR ON/OFF CONVERSION OF AN IMAGE ANALYSIS SIGNAL

[75] Inventor: Gérard Biron, Cressely, France

[73] Assignee: Compagnie Industrielle des Telecommunications Cit-Alcatel, Paris, France

[21] Appl. No.: 70,760

[22] Filed: Aug. 30, 1979

[30] Foreign Application Priority Data

Sep. 21, 1978 [FR] France .................... 78 27070

[51] Int. Cl.³ .................................. H04N 1/40
[52] U.S. Cl. ........................................ 358/282
[58] Field of Search .............. 358/282; 340/146.3 AG

[56] References Cited

U.S. PATENT DOCUMENTS

| 3,566,281 | 2/1971 | Baumann | 358/282 |
| 3,723,649 | 3/1973 | Pitegoff | 358/282 |
| 3,987,413 | 10/1976 | Wilmer | 358/282 |

*Primary Examiner*—Howard W. Britton
*Attorney, Agent, or Firm*—Sughrue, Rothwell, Mion, Zinn and Macpeak

[57] ABSTRACT

When a document is scanned, for example in a facsimile transmitter, an image analysis signal is formed. This signal has a level which varies between a maximum black level and a maximum white level and it is converted into an on/off (e.g. black and white) signal by comparison with a threshold. For good results on backgrounds of various tones it is necessary for the threshold to vary. The present pulse-forming circuit has a first detector 2 arranged over each scan line to detect and store a background level signal $\Delta$. It has a second detector 3 arranged over a few successive image points to detect an average value signal $V'$. These signals are combined by threshold determining circuit 4 to generate a threshold $V_d$ such that $V_d = K\Delta + K'\Delta$ where $K$ and $K'$ are two constants satisfying the relationships:

$$0 \leq K < 1;$$

$$0 < K' < 1; \text{ and}$$

$$0 < K + K' < 1, \text{ e.g. } K = \tfrac{1}{4} \text{ and } K' = \tfrac{1}{2}$$

A comparator 1 performs the on/off conversion of the analog analysis signal $V_a$ into a binary pulsed signal $V_s$ by comparison of $V_a$ with the threshold $V_d$.

8 Claims, 3 Drawing Figures

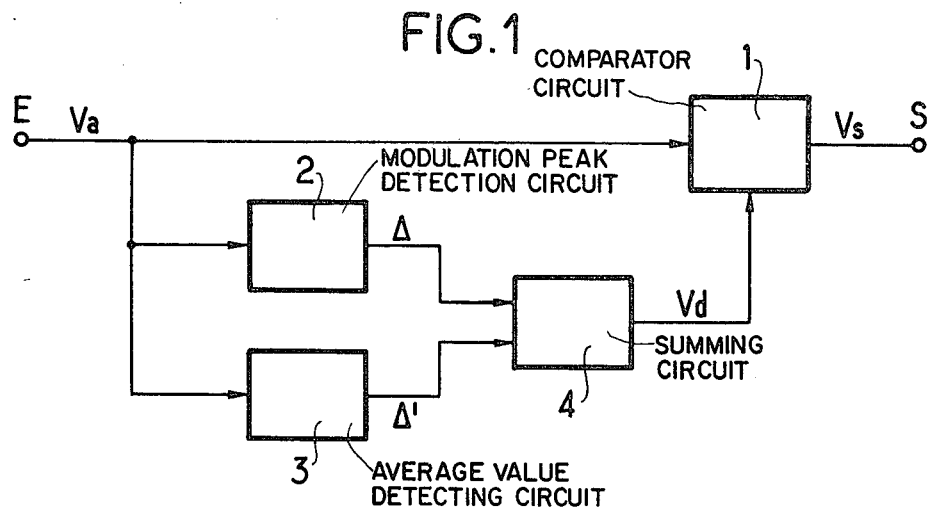
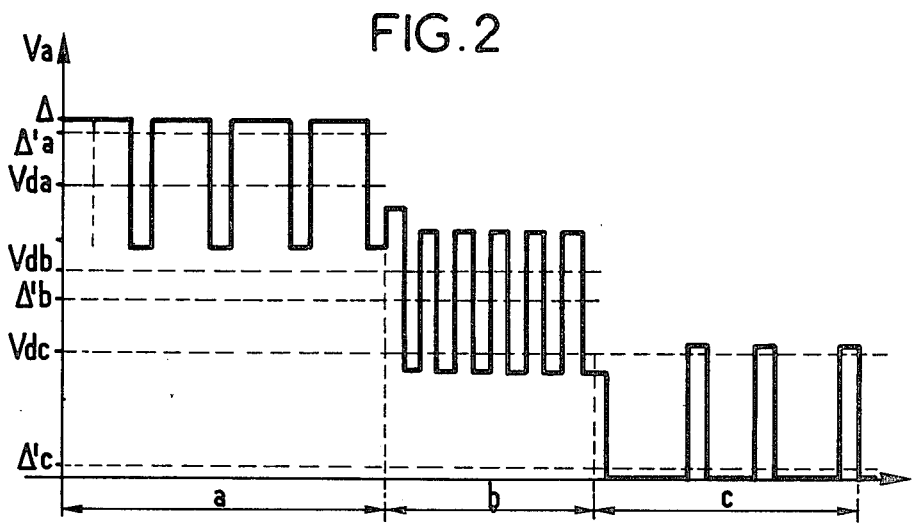

PULSE-FORMING CIRCUIT FOR ON/OFF CONVERSION OF AN IMAGE ANALYSIS SIGNAL

The present invention relates to a pulse-forming circuit for on/off conversion of an image analysis signal with reference to a variable comparison threshold signal established by the pulse-forming circuit. The pulse-forming circuit is intended, in particular, to be used for on/off conversion of facsimile signals derived from document analysis in facsimile signal transmission installations.

A document analysis signal is a signal which is modulated in amplitude between two limit levels: a maximum black level and and a maximum white level corresponding respectively to black elements and to white elements in the document being analyzed. Generally speaking, the white level is higher than the black level in the analysis signal as detected, for example, by a photodiode; however, these relative levels may be inverted by analog pre-processing, e.g. using an inverting amplifier.

On/off conversion of an image analysis signal, i.e. its transformation into a two level signal, requires it to be compared with a reference signal that lies between the two modulation limits. In practice, the reference signal is chosen to have a value close to the maximum white level of the image.

When the document being analyzed has a non-uniform background, and/or information-conveying elements of non-uniform tone, it is no longer satisfactory to compare the analysis signal with a constant reference signal. Indeed, in such a case the analysis signal may be of very variable amplitude, and further the amplitude may also be considerably reduced from the maximum modulation levels when closely spaced black-white alternations are being analyzed. It is thus known to vary the value of the reference signal which constitutes the decision threshold for comparison, as a function of the modulation levels in the said analysis signal.

Preferred embodiments of the present invention provide a circuit which determines a decision threshold that varies as a function of the background tone of an image and also as a function of the successive modulation levels of the image signal.

The present invention provides a pulse-forming circuit for on/off conversion of an image analysis signal representative of successive image points along successive image scan lines, the signal being modulated such that its level varies between two limit levels corresponding to image white and to image black, the pulse-forming circuit converting the image analysis signal to an on/off signal by comparing the said image analysis signal with a decision threshold, and the decision threshold being variable as a function of the level of the image analysis signal, wherein the pulse-forming circuit comprises an image background level detector circuit connected to receive the image analysis signal and to operate over a scan line to detect the level $\Delta$ of the image background, an average value detector circuit connected to receive the image analysis signal and to operate over a few successive image points to detect the average value $\Delta'$ thereof and a circuit for determining the said variable decision threshold, connected to receive the background level $\Delta$ and the average value $\Delta'$ from the detector circuits and to provide the said decision threshold at a value $V_d$ which satisfies a function having the form $V_d = K\Delta + K'\Delta'$, where K and K' are two coefficients which satisfy the following relationships:

$0 \leq K < 1;$ $0 < K' < 1;$ and $0 < K + K' < 1.$

An embodiment of the present invention is described by way of example with reference to the accompanying drawings in which:

FIG. 1 is a block diagram of a pulse-forming circuit in accordance with the invention;

FIG. 2 illustrates the operation of the circuit in accordance with the invention.

Figure 3:
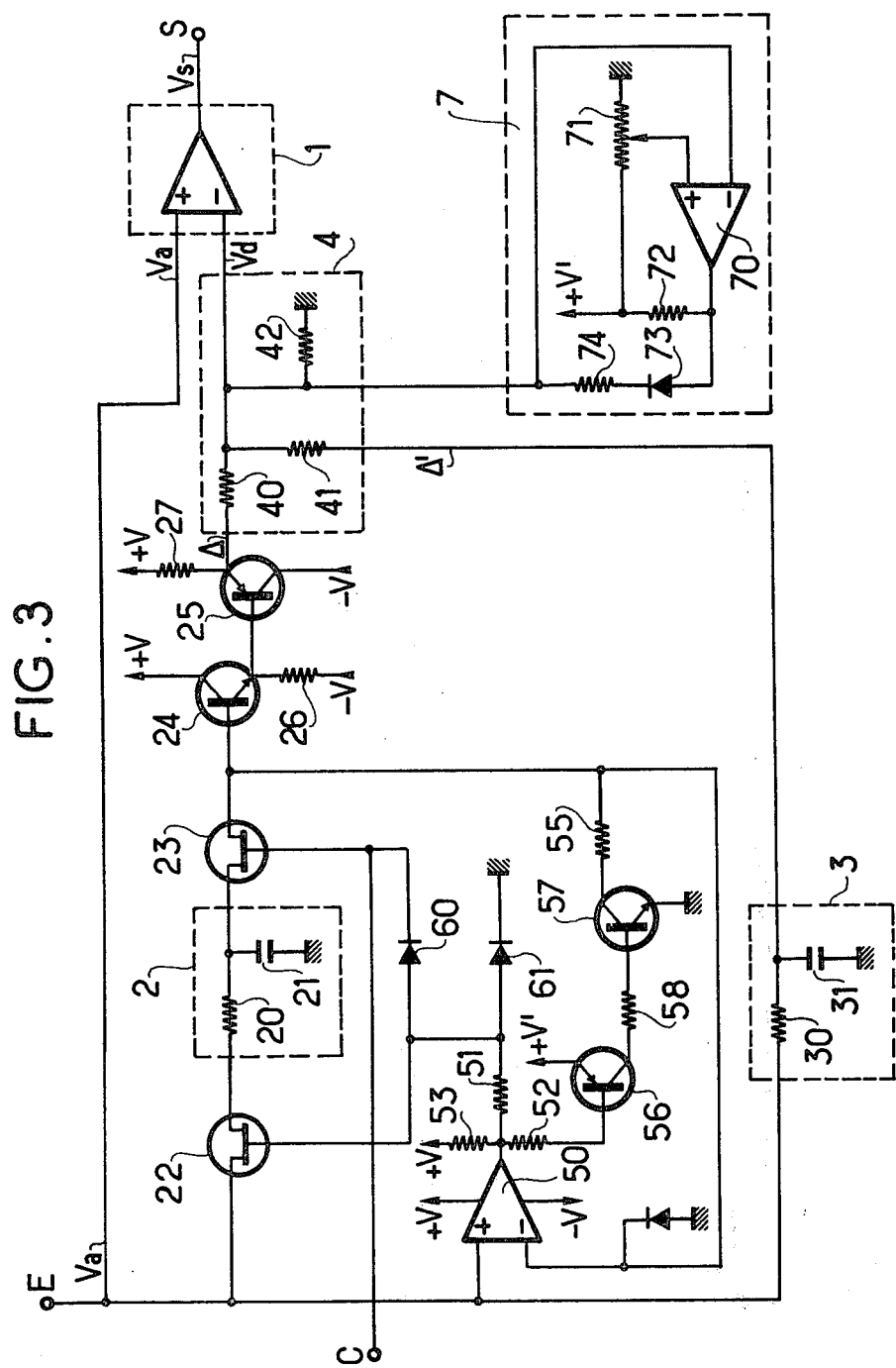
FIG. 3 is a circuit diagram of one embodiment of the invention.

FIG. 1 is a block diagram of a pulse-forming circuit for processing an image analysis signal to convert it into an on/off signal by comparing it with a variable decision threshold. The input of the pulse-forming circuit is referenced E and receives the image analysis signal $V_a$. The signal $V_a$ is representative of successive image points along successive image scan lines, and it is modulated to a level which is variable between two limit levels corresponding to maximum image white and to maximum image black. In this particular analysis signal $V_a$ the white level amplitude is higher than the black level amplitude. The output of the pulse-forming circuit is referenced S and provides a signal $V_s$ which is the signal $V_a$ reproduced in binary form.

The image analysis signal $V_a$ is applied to a comparator circuit 1 which is constituted by an operational amplifier. The comparator circuit 1 also receives the decision threshold $V_d$ and its output constitutes the output S of the pulse-forming circuit To determine the decision threshold $V_d$, the pulse-forming circuit includes a circuit 2 which receives the signal $V_a$ and detects modulation peaks therein. This circuit includes a device, e.g. a capacitor, for storing the maximum detected peak value $\Delta$. The pulse-forming circuit also includes a circuit 3 also connected to the input E and for detecting the average value $\Delta'$ of the signal $V_a$ over a few successive image analysis points. Finally, the pulse-forming circuit includes a circuit 4 for summing the detected values $\Delta$ and $\Delta'$ to determine the decision threshold in accordance with the relationship $V_d = K\Delta + K'\alpha'$. It is this decision threshold $V_d$ which is applied as a reference voltage to the comparator circuit 1.

The values of the coefficients K and K' are chosen as a function of the characteristics of the analysis signal. In one embodiment, described by way of example, K is chosen to equal ⅓ and K' is chosen to equal ½, thereby giving the relationship $V_d = \Delta/3 + \Delta'/2$. The choice of the decision threshold $V_d$ substantially according to this relationship favours the appearance of black points on a white image background at the pulse-forming forming circuit output S. Indeed, if white image points follow one another, the average value $\Delta'$ becomes very close to the maximum value $\Delta$; and for $\Delta' = \Delta$, the decision threshold $V_d$ takes the value $V_d = 5/6\Delta$ which is thus very close to maximum white level. The choice of decision threshold with the value $V_d = \Delta/3 + \Delta/2'$ also favours the reading of white points on a black background at the pulse-forming circuit output S. Indeed, if the image analysis signal $V_a$ represents widely separated white points the average detected value $\Delta'$ is very close to the black image level; and for $\Delta'=0$, the decision threshold takes the value $V_d=\Delta/3$ and has thus been brought to a value which is relatively close to the black level, which in practice makes it possible for the pulse-forming circuit still to detect white points on a black background even though their amplitude in the signal $V_a$ is considerably reduced.

In FIG. 2, the values taken by the decision threshold $V_d$ are shown as a function of a signal $V_a$. FIG. 2 is divided into three zones a, b and c, in which the signal $V_a$ represents respectively: a low density of black image points on a white background in the zone a; and alternation of black and white image points in the zone b; and a low density of white image points on a black background in the zone c. The signal $V_a$ is shown in all three zones with a large loss of amplitude compared with the limiting levels of maximum image black (zone a), of maximum image white (zone c), or of both maximum image black and maximum image white limiting levels (zone b). This results in both the zones a and c by the fact that the black (or white as the case might be) points are rare in the corresponding image zone whose overall tone is white (or black as the case might be), and in the zone b from the alternation of black and white points in the corresponding image zone. On the y-axis the maximum peak value for the set of all three zones is designated $\Delta$ while the average values detected in each of the these zones are designated $\Delta'a$, $\Delta'b$ and $\Delta'c$ respectively. The decision threshold values for each of these zones $V_{da}$, $V_{db}$ and $V_{dc}$ are also marked on the y-axis.

In the zone a, $\Delta'a$ is substantially equal to $\Delta$; the threshold $V_{da}$ is close to $\Delta$ and has a value substantially equal to $5/6\Delta$.

In the zone b, $\Delta'b$ is substantially equal to $\Delta/2$, and the value of $V_{db}$ is substantially equal to $7/12\Delta$.

In the zone c, $\Delta'c$ is substantially equal to 0, the value of $V_{dc}$ is brought down towards the black level and becomes extremely close to $\Delta/3$.

FIG. 3 is a circuit diagram of one embodiment of a pulse-forming circuit in accordance with the invention. In FIG. 3, the various blocks of FIG. 1 re-appear with the same reference numerals. It can be seen that the comparator circuit is constituted by an operational amplifier receiving the signal $V_a$ on its +input and the decision threshold $V_d$ on its −input, and providing the signal $V_s$ at its output. The circuit 2 for detecting the maximum peak value of the signal $V_a$ is constituted by a resistor 20 and a capacitor 21 connected to earth. The pulse-forming circuit input E is connected to the resistor 20 (which constitutes a charging resistance for the capacitor 21) via a field effect transistor 22 whose drain and source electrodes are connected to the input E and to the resistor 20. The connection between the capacitor 21 and its charging resistance 20 is connected via the drain and source electrodes of another field effect transistor 23 to convey the signal $\Delta$ to a circuit for discharging the capacitor 21 (described below) and to a two transistor (24 and 25) output amplifier circuit. In the amplifier, the transistor 24 is an NPN-type transistor with its base connected to the field effect transistor 23, its collector connected to a positive supply +V and its emitter connected to a negative supply −V via a resistor 26; the transistor 25 is a PNP-type transistor and has its base connected to the emitter of the transistor 24, its emitter which constitutes the output of the amplifier connected to the +V supply via a resistor 27, and its collector connected to the −V supply.

The field effect transistor 22 is switched on by detecting a peak value in the signal $V_a$ which is greater than that stored on the capacitor 21. To this end, a comparator formed by an operational amplifier 50 powered from the +V and −V supplies, has a positive input connected to the input E and its negative input connected to the output of the field effect transistor 23. The output signal of the operational amplifier 50 is applied via a resistor 51 to the gate of the field effect transistor 22. The field effect transistor 22 constitutes the circuit for controlling the charging of the capacitor 21. It behaves like a closed switch when the signal $V_a$ has a value greater than the stored peak value and like an open switch otherwise.

The circuit for discharging the capacitor 21 comprises a high value resistor 55 connected to the output of the field effect transistor 23 and defining, together with the capacitor 21, a long discharge time constant for a slow discharge of the capacitor. The resistor 55 is also connected to a two transistor (56 and 57) circuit controlled from the signal delivered by the operational amplifier 50. The transistor 56 is a PNP-type transistor and has its base connected to a resistor 52 which is connected to the output of the operational amplifier 50 and which is connected in series with a resistor 53 connected to the positive supply +V. The emitter of this transistor is connected to a bias supply +V' at a lower potential than the supply +V, its collector is connected via a resistor 58 to the base of the transistor 57 which is an NPN-type transistor whose emitter is connected to earth and whose collector is connected to the discharge resistor 55.

The field effect transistor 23 is itself controlled by the signal delivered by the operational amplifier 50 and applied to its gate via the resistor 51 and a diode 60 connected to conduct from the resistor 51 to the field effect transistor. A diode 61 is connected between the resistor 51 and earth to conduct from the resistor 51 to earth and is associated with resistors 51 and 53 to control both field effect transistors 22 and 23.

Both field effect transistors 22 and 23 are also controlled by a signal indicative of the image scan being in between two successive scan lines, via a control input C which is connected to the gate of the field effect transistor 23 and to the gate of the field effect transistor 22 via the diode 60. This signal is provided between the end of each scan line and the beginning of the next scan line by the same image analysis circuit which delivers the signal $V_a$. This signal is constituted by a negative voltage between scan lines and turns off both field effect transistors 22 and 23. During scan lines the signal has a positive value which turns on the field effect transistor 23.

In FIG. 3, the circuit 3 for detecting the average value $\Delta'$ of the signal $V_a$ over a period of several analysis points, is constituted by a capacitor 31 associated with a charging resistor 30. The circuit 4 for determining the decision threshold $V_d$ is constituted by a resistor network comprising a resistor 40 connected to the emitter of the transistor 25, a resistor 41 connected to the connection between the resistor 30 and the capacitor 31, and a resistor 42 connected between earth and the resistors 40 and 41. The resistance values of the resistors 40, 41 and 42 are defined relative to each other and putting the value of the resistor 40 as $R_1$, that of the resistor 41 as $R_2$, that of the resistor 42 as $R_3$, and that of the resistor 30 as $R_4$, the resistance values are related as follows:

$$R_2 >> R_4$$

$$R_1 = K'/K \, R_2$$

$$R_3 = K'/(1-K-K'R_2)$$

In order to obtain a decision threshold $V_d$ such that $$V_d = K\Delta + K'\Delta',$$

which is applied to the comparator circuit 1.

When $K = \frac{1}{3}$ and $K' = \frac{1}{2}$ as in the chosen example, these relationships become:

$$R_2 >> R_4$$

$$R_1 = 3/2 R_2$$

$$R_3 = 3R_2$$

to obtain a decision threshold $V_d$ such that
$$V_d = \Delta/3 + \Delta'/2$$

Further, the processor circuit shown in FIG. 3 is completed by a circuit 7 for limiting the decision threshold $V_d$. The circuit 7 comprises an operational amplifier 70 which receives the decision threshold $V_d$ at its negative input as provided by the output of the circuit 4, and receives a defined fixed voltage at its positive input determining the minimum value of the decision threshold to be applied to the comparator 1. This fixed voltage is taken from an intermediate point of a resistance 71 connected between the $+V'$ supply and earth. The output of the operational amplifier 70 is connected to the $+V'$ supply via a resistor 72. When the signal $V_d$ is lower than the minimum threshold value, the output of the amplifier 70 is connected to the connection between the resistors 40, 41 and 42 via a resistor 74 and a diode 73 which then becomes conductive, thereby maintaining the threshold $V_d$ as applied to the negative input of the operational amplifier of the circuit 4 at least at this minimum value.

In operation, the positive voltage supplied at the output of the operational amplifier 50 when the level of the signal $V_a$ appearing at E is greater than the stored peak value $\Delta$, causes the field effect transistor 22 to turn on to charge the capacitor to the appropriate value. Simultaneously, the discharge circuit 55, 56 and 57 is turned off and the field effect transistor 23 is conductive.

The negative voltage is supplied from the output of the operational amplifier 50, when the level of the signal $V_a$ present at E is below the stored value $\Delta$, and turns off the field effect transistor 22. Simultaneously the diode 60 isolates the gate of the field effect transistor 23 from the negative voltage at the output of the operational amplifier 50 and is connected to a positive potential by the terminal C. Also simultaneously by virtue of the transistors 56 and 57 being turned on, the resistor 55 is connected to earth and the capacitor 21 discharges slowly.

Between two successive image analysis lines the field effect transistors 23 and 22 are turned off by the terminal being connected to a negative voltage: the capacitor 21 neither charges nor discharges.

This pulse-forming circuit thus makes it possible to vary the decision threshold of the image background as detected on an analysis line and as a function of the density of analysis points to be detected on this background.

I claim:

1. A pulse-forming circuit for on/off conversion of an image analysis signal representative of successive image points along successive image scan lines, the signal being modulated such that its level varies between two limit levels corresponding to image white and to image black, the pulse-forming circuit converting the image analysis signal to an on/off signal by comparing the said image analysis signal with a decision threshold, and the decision threshold being variable as a function of the level of the image analysis signal, wherein the pulse-forming circuit comprises an image background level detector circuit connected to receive the image analysis signal and to operate over a scan line to detect the level $\Delta$ of the image background, an average value detector circuit connected to receive the image analysis signal and to operate over a few successive image points to detect the average value $\Delta'$ thereof and a circuit for determining the said variable decision threshold, connected to receive the background level $\Delta$ and the average value $\Delta'$ from the detector circuits and to provide the said decision threshold at a value $V_d$ which satisfies a function having the form $V_d = K\Delta + K'\Delta'$, where K and K' are two coefficients which satisfy the following relationships:

$$0 \leq K < 1;$$

$$0 < K' < 1; \text{ and}$$
$$0 < K + K' < 1.$$

2. A pulse-forming circuit according to claim 1, wherein the said image background detector circuit comprises a peak detector and a detection control circuit connected upstream of the said peak detector, the detection control circuit acting as a switch which is switched on when the level of the analysis signal is greater than the previously detected value $\Delta$ and off when it is less than the said previously detected value $\Delta$, and is forced to the off condition by a signal indicative of the fact that an image analysis line is not being scanned, the peak detector also having a circuit for controlling the use of the detected background value $\Delta$ connected downstream thereof, the use-controlling circuit also acting as a switch and being switched on by a signal indicative of an image analysis line being scanned and being switched off by a signal indicative of the fact that an analysis line is not being scanned.

3. A pulse-forming circuit according to claim 2, including a discharge circuit connected to the said peak detector via the said circuit for controlling the use of the detected background value and turned on by any level of the said analysis signal which is below the detected background value $\Delta$.

4. A pulse-forming circuit according to claim 3, wherein the said discharge circuit is constituted by a resistance and a transistor connected in series between earth and the said circuit for controlling the use of the detected background value $\Delta$, said transistor being turned on as soon as the level of the analysis signal is below the detected background value $\Delta$.

5. A pulse-forming circuit according to any preceding claim, wherein the said circuit for providing the said decision threshold $V_d$ is constituted by a resistor network comprising a first resistance $R_1$ receiving the said detected background value $\Delta$, a second resistance $R_2$ receiving the said average value $\Delta'$, and a third resistance $R_3$ connected between earth and the other two resistances to define the value of the said decision threshold $V_d$ at the common connection, the values of the three resistances being inter-related by the equations $R_1 = K'/K\ R_2$ and $R_3 = K'/(1-K-K')R_2$.

6. A pulse-forming circuit according to claim 1, wherein the circuit for detecting the said background value $\Delta$ is constituted by a first RC network having a short charging time constant, receiving the said analysis signal via a first controlled field effect transistor, and supplying the said detected background value $\Delta$ via a second controlled field effect transistor, firstly to the said circuit for determining the said decision threshold $V_d$ and secondly to a discharge circuit, and wherein the pulse-forming circuit further includes an operational amplifier which receives the said analysis signal and the said detected background value $\Delta$ as delivered by the said second field effect transistor, the operational amplifier serving to switch on the said first field effect transistor when the level of the analysis signal is greater than the said detected background value $\Delta$ and to switch on the said discharge circuit when the level of the analysis signal is less than the said detected background value $\Delta$, the said second field effect transistor being switched on by a control signal applied to a control input of the pulse-forming circuit when the analysis signal applied thereto is representative of points in an image analysis line and being forced off with the said first field effect transistor by the said control input by the inverse control signal when the analysis signal is not representative of points along an image analysis line.

7. A pulse-forming circuit according to claim 1 or 6, including a circuit for limiting the minimum value of the said decision threshold, said circuit being associated with the said circuit which delivers the said decision threshold $V_d$ and including a circuit for detecting the value of the said decision threshold $V_d$ with respect to a given minimum value and for maintaining the said detection threshold $V_d$ at least to the said minimum value.

8. A pulse-forming circuit according to claim 1 or 6, wherein the value K is chosen to be substantially equal to ⅓ and the value K' is chosen to be substantially equal to ½, whereby the value of the decision threshold is substantially equal to $V_d = \Delta/3 + \Delta/2$.

* * * * *